July 14, 1959 L. H. JOHNSON 2,895,014

MAGNETIC RECORDING HEAD-MOVING MECHANISM

Filed July 6, 1953 3 Sheets-Sheet 1

INVENTOR.
LENARD H. JOHNSON

BY I. Gordon Angus

ATTORNEY.

July 14, 1959 L. H. JOHNSON 2,895,014

MAGNETIC RECORDING HEAD-MOVING MECHANISM

Filed July 6, 1953 3 Sheets-Sheet 2

INVENTOR.
LENARD H. JOHNSON
BY D. Gordon Angus
ATTORNEY.

INVENTOR.
LENARD H. JOHNSON

BY
[signature]
ATTORNEY.

United States Patent Office 2,895,014

Patented July 14, 1959

2,895,014

MAGNETIC RECORDING HEAD-MOVING MECHANISM

Lenard H. Johnson, Pasadena, Calif., assignor, by mesne assignments, to United Geophysical Corporation, Pasadena, Calif., a corporation of California Application July 6, 1953, Serial No. 366,214

16 Claims. (Cl. 179—100.2)

This invention relates to magnetic tape recording and playback and has for its principal object to provide mechanism for recording and reproducing magnetic records on magnetic tape in selected time relationships.

It has been proposed to record on magnetic tape, wave trains of wave motion in media such as the earth, air and water. A typical application is in seismographic work wherein waves are propagated through the earth or water from disturbances such as explosions. Such wave trains include random waves and various wave reflections from objects or sub-surface strata and the like. Such wave reflections commonly return to the surface where they are received as wave transients intermingled and often masked by the random waves of the train.

In such seismographic work it is often desirable to identify and develop the shape and characteristic of the transients and for this purpose it has been proposed to detect and record the wave trains including the transients as they are received from different detectors located at different points at or near the surface of the earth or water. One way which has been proposed is to record the detected waves on magnetic tape as records placed side by side; and then to play back the records in a different time relationship from that by which they were recorded. By properly adjusting the time distances of the several playback elements, and combining their outputs, it is possible to develop and distinguish desirable transients from among random masking waves. Such a system and method is described and claimed in the copending application of Raymond A. Peterson, entitled "Wave Transmission System," Serial No. 349,407, filed April 17, 1953, assigned to the same assignee as the present application.

A feature of the present invention resides in the provision of a plurality of blocks each containing at least one, but preferably more than one, magnetic head of the type adapted to record or playback on a magnetic tape record. Provision is made for moving the blocks relative to each other to vary the time relationship of the heads of the blocks.

A feature is the use of screw adjusting means for moving the blocks. A related feature resides in the use of flexible cable means for operating the screw adjusting means.

The foregoing and other features will be better understood from the following detailed description and the accompanying drawings, of which:

Figure 10:
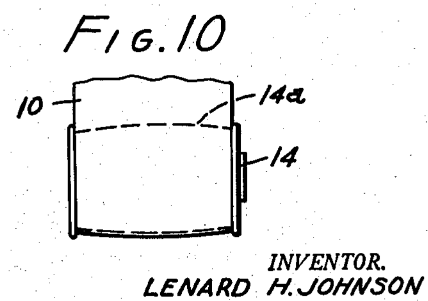
Fig. 10 is a view showing a detail taken at line 10—10 of Fig. 1.

Referring to the drawings, the system comprises a magnetic tape 10 of a well-known type wide enough to have a number of magnetic records made on it side by side. The tape is of the endless construction and is mounted over four pulleys 11, 12, 13 and 14, mounted on a suitable panel 9, as shown. Pulley 11 is mounted on the drive shaft 15 of a motor 16 fastened to the panel; and the other pulleys 12, 13 and 14 are idler pulleys. The pulley 14 is preferably provided with a crowned surface 14*a* (Fig. 10) as this will aid in keeping the tape running straight in its path in spite of such slight imperfections as may exist in the straightness of the tape itself. Pulley 13 is mounted on a shaft 17 supported by an arm 18 freely pivoted at a pivot 19 through the panel so that the arm and pulley 13 will rest on the tape 10 to keep it at the proper degree of tautness. The counterweight 70 fastened on an arm 71 is also attached to the pivot 19 so that members 18, 19 and 71 act as a bell crank. The counterweight 70 and arm 71 counterbalance the weight of pulley 13 and arm 18; and to maintain the desired degree of tautness of the tape, the pivot member 19 is spring loaded by a spring which may conveniently be a spiral spring 72 fastened to the inside of a covering cap 73 by a suitable fastening means such as a screw 74. The end of spring 72 opposite the screw 74 is set into a suitable groove 75 in the end of pivot member 19. The direction of the spring pressure is such as to tend to rotate the arm 18 in the clockwise direction with reference to Fig. 1. The amount of spring pressure is adjustable by removing screws 75*a* from the cap and rotating the cap in angular intervals of for example 60° or 120° and then reinserting the screws.

Since the weights of the members 13, 18, 70 and 71 extending on opposite sides of the pivot 19 substantially counterbalance each other, the forces of shocks or impacts are thus substantially eliminated. Such shocks or impacts would occur if for example, the device is carried in a moving vehicle. The effect of such impacts will be applied equally on both sides of the pivot 19 so that there will be substantially no resulting torque in either direction from the impacts; and the only substantial torque remaining on pivot 19 will be that due to the spring loading.

The path of travel of the tape passes adjacent a housing 20 containing magnetic heads for making or playing back records on the tape. The housing 20 has opposite walls 21 and 22 and a side wall 23 provided with a number of longitudinal grooves or tracks 24, 25 and 26 into which there protrude corresponding feet 27, 28 and 29 provided for each block A, B, C and D.

Figure 5:
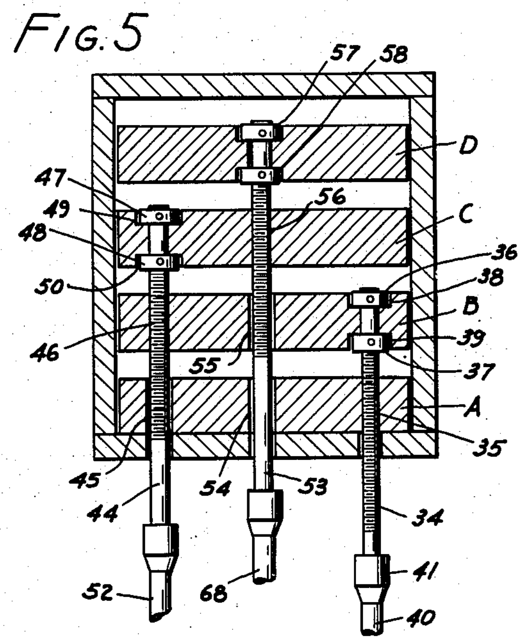
Fig. 5 is a cross-section view taken at line 5—5 of Fig. 1.

Retaining members 30 and 31 support the sides of the blocks adjacent their edges. The arrangement is such that three of the blocks B, C and D are slidable lengthwise in the housing in the up-down direction of Figs. 1, 3 and 5.

Figure 1:
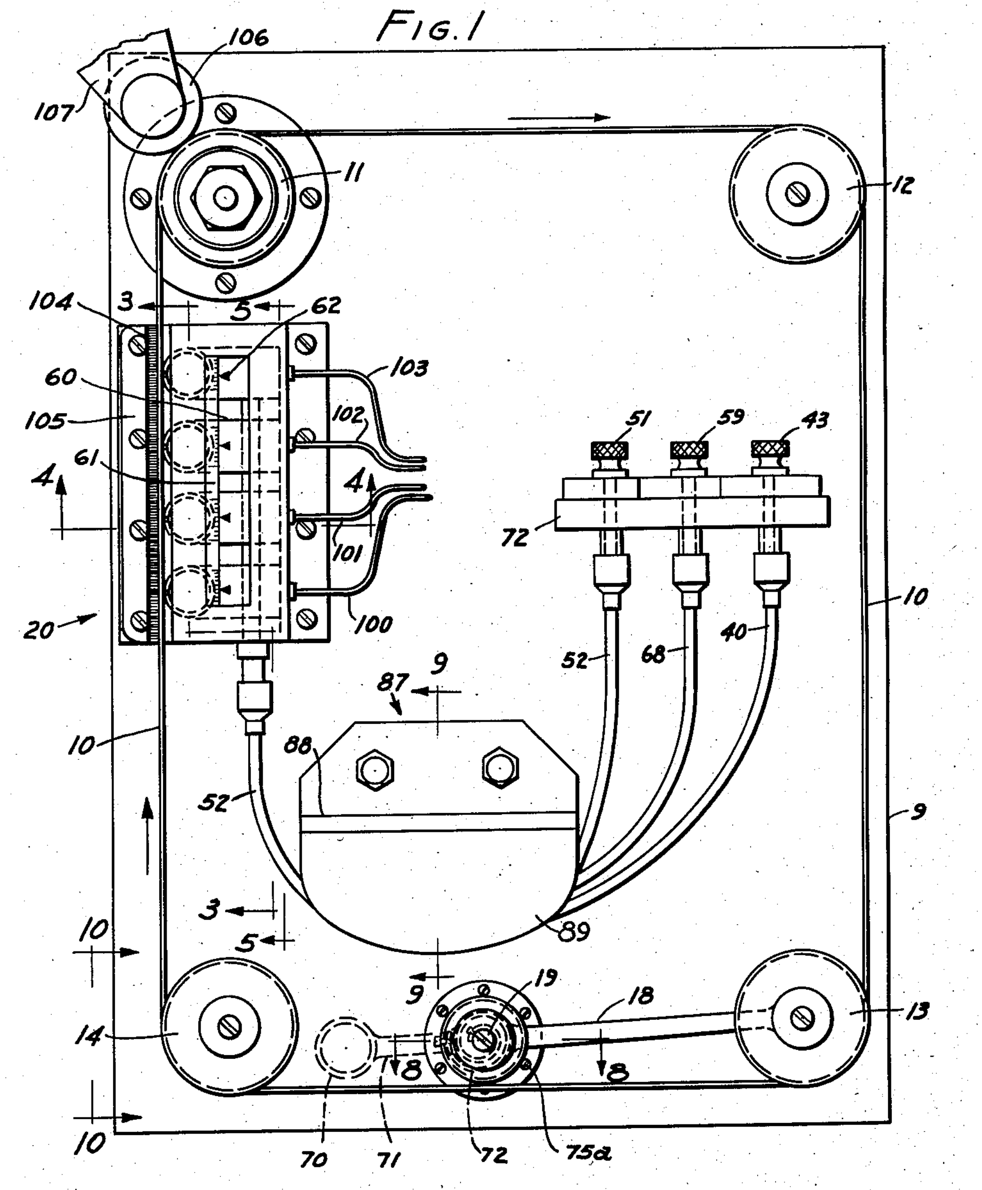
Fig. 1 is a side view and Fig. 2 an end view of a magnetic tape recording and playback system embodying the invention.
Figure 9:
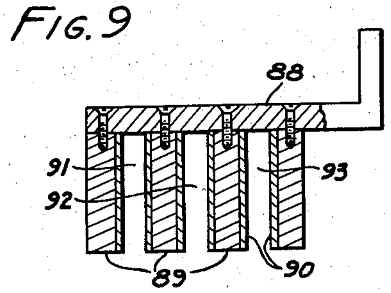
Fig. 9 is a view partially in cross-section taken at line 9—9 of Fig. 1.
Figure 6:
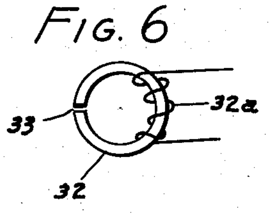
Fig. 6 is a side view and Fig. 7 an end view of a magnetic core member used in the system.
Figure 7:
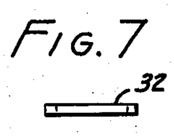

The heads, fastened within the respective blocks, have magnetic members in the general shapes shown in Figs. 6 and 7; that is, each head comprises a ring 32 of magnetic material provided with a narrow air gap 33 at its lower region. The winding 32*a* associated with the magnetic core 32 is shown only schematically as particular arrangements of the winding are well understood in the art and are no part of the present invention. The leads from the several heads are brought out through suitable flexible conduits or sheaths 100, 101, 102 and 103, passed through bushings 78, fitted through holes 77 and slidable through slots 79 as the blocks are moved. The several heads of each block, such as heads *4a*, *5a*, *6a*, *7a*, etc., of block A and heads *4b*, *5b*, *6b*, *7b*, etc., of block B are fastened into their respective blocks with the air gaps facing toward the tape; and to hold the tape in close contact with the heads there is provided a strip 104 of a material such as felt or carpeting supported on a backing member 105 mounted on the housing 20. As the material 104 will introduce some friction, it is desirable to provide a pinch roller 106 which can be mounted on a support 107 attached to the panel 9, to press the tape tightly against the drive capstan 11 so that the tape can be driven without slippage; the tape being pulled upwardly past the housing in the direction of the arrow (Fig. 1). The lateral spacings of the different heads by which the magnetic records are made on the tape are such that the several records are side by side. Thus, the record produced by the air gap of head *4a* is located adjacent an edge of the tape and extends parallel to the direction of movement of the tape. The next record is that produced by head *4b* of block B; the next record by head *4c* of block C; and the next record by head *4d* of block D. The fifth record will be produced by head *5a* of block A; and for this purpose head *5a* will have a proper lateral position in its block. The trace from head *5b* is next, and so on.

Figure 4:
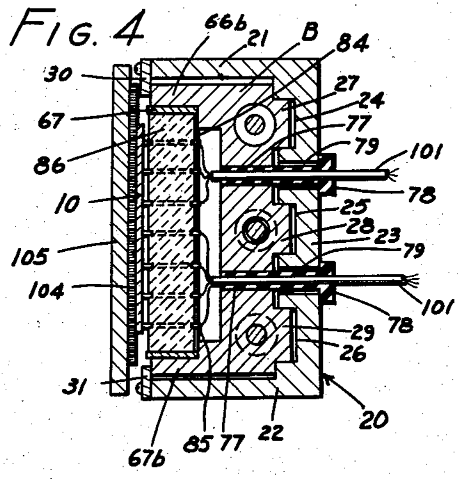
Fig. 4 is a cross-section view taken at line 4—4 of Fig. 1.

For holding the heads in position, each block is provided with a container or box 67 having four side walls 80, 81, 82 and 83 and a bottom wall 84 (see Figs. 3 and 4), which may conveniently be of brass; and to space the cores 32 properly from each other suitable grooves 85 may, if desired, be formed in the wall 84 in which to set the respective cores. With the heads set in position, the box or container 67 is then filled with a suitable binder such as an insulating plastic 86, which upon hardening maintains the heads of the box securely in position, leaving the outer edges of the air gaps at the surface of the plastic which is adjacent the magnetic tape.

Figures 2, 3, 3A:
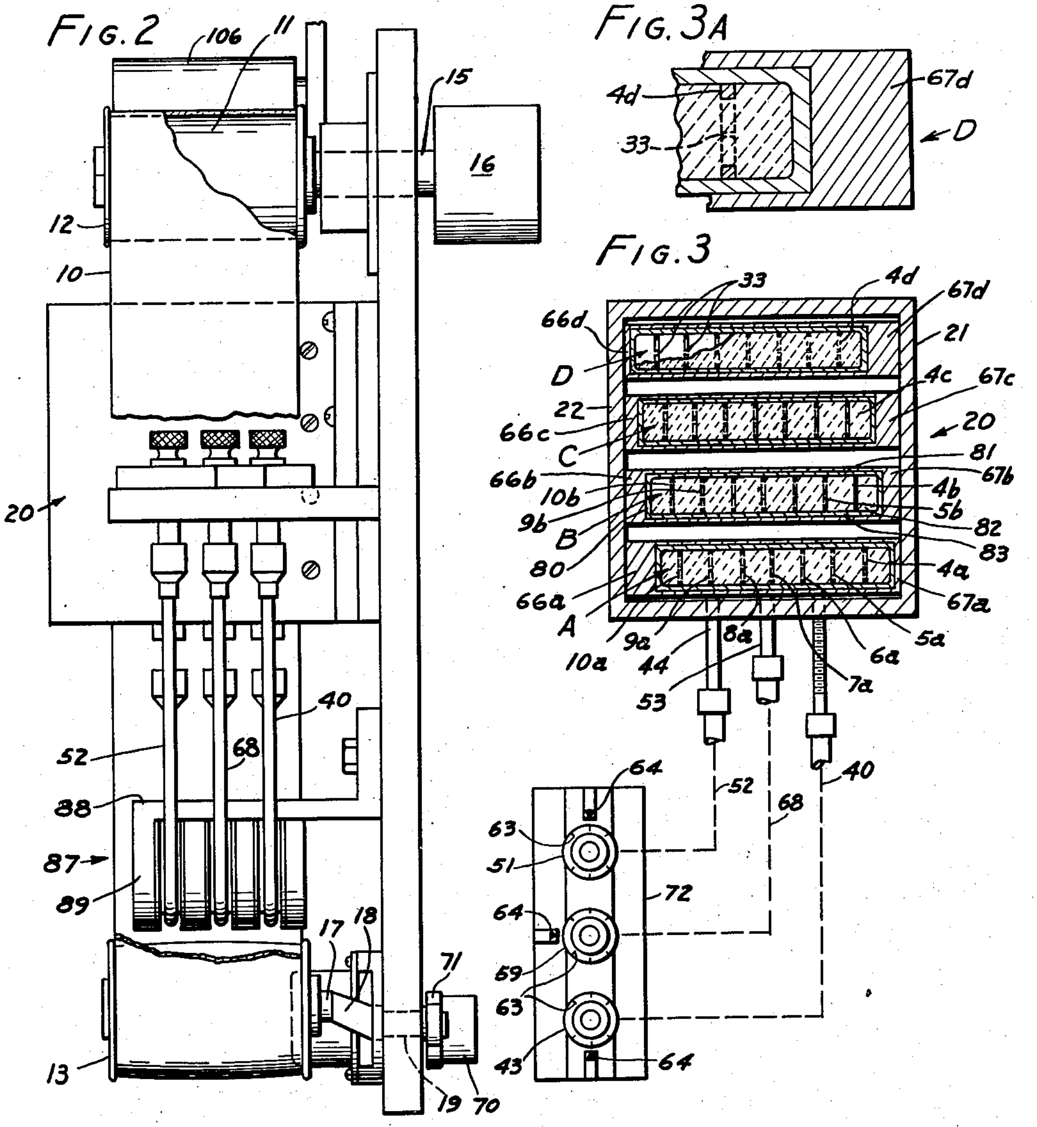
Fig. 3 is a cross-section view taken at line 3—3 of Fig. 1.
Fig. 3A shows in section an enlarged detail from Fig. 3.
Figure 8:
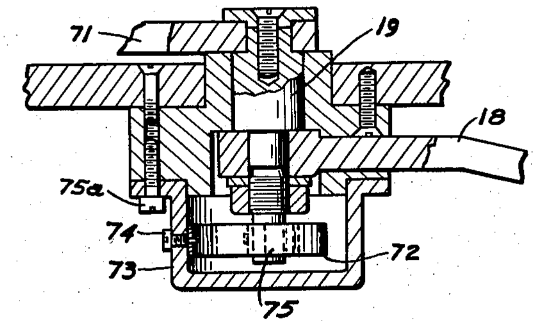
Fig. 8 is a cross-section view taken at line 8—8 of Fig. 1.

All four containers 67 for the heads of the several blocks can be made of the same dimensions and to secure the desired offset of the heads of the respective blocks, the side walls of the blocks can be made of different thickness to act as offsetting shims. Thus, block A has a wall *66a* of a substantial thickness to place its head container substantially toward the right with reference to Fig. 3; block B will have a wall *66b* which is somewhat thinner; block C will have a wall *66c* still thinner, and block D will have the thinnest wall *66d*. The opposite walls *67a*, *67b*, *67c* and *67d* of the blocks will have the corresponding gradations of thickness as shown in Fig. 3. The containers 67 can be fitted into position within their respective blocks by any suitable means such as a snug fit or any other suitable retaining means (not shown). Since all the containers with their blocks are made of the same dimensions the containers will be interchangeable among the several blocks.

The block A with its group of heads may be fixed in position; and no provision is shown for moving it. The other blocks B, C and D are made movable in the direction of movement of the tape; and for this purpose a shaft means is attached to each of these latter three blocks.

The shaft means for block B comprises the stud 34 threaded at 35 through a threaded hole in fixed block A, the end of stud 34 having fixed to it suitable washers or bushings 36 and 37 adapted to rotate in respective recesses 38 and 39 of block B. A flexible cable 40 is attached to the end of stud 34 by means of the coupling 41. The dial or wheel 43 at the operating end of cable 40 may be fastened in a convenient position such that rotation of wheel 43 turns the cable causing head B to slide up or down (Figs. 1, 3 and 5) according to the direction of rotation. In this way the spacing of block B from fixed block A is adjusted.

Block C is movable by means of stud 44 passing freely through a hole 45 through block A and threaded at 46 through block B and terminating at block C by means of the bushings 47 and 48 in the respective recesses 49 and 50 of block C. Rotation of wheel 51 on the end of the flexible shaft 52 serves to adjust the distance from block B to block C.

A similar arrangement is provided for block D, this comprising the stud 53 passing freely through holes 54 and 55 of blocks A and B and threaded at 56 through block C and terminating in the bushings 57 and 58 at block D. Rotation of wheel 59 on the end of the flexible shaft 68 connected to rod 53 adjusts the position of block D relative to block C.

The dials 43, 51 and 59 can be mounted on a suitable panel or mounting member 72 and it may if desired be placed even somewhat away from the head housing or the panel 9.

A preferred arrangement is that shown in Figs. 1 and 2, the dotted lines of Fig. 3 merely being schematic. A guide 87 is bolted to the face of the panel. The guide comprises an angle bracket 88 mounted on the panel as by bolts and having spaced members 89 depending therefrom by screws. Preferably the sides of partitions 89 are lined with a metal such as brass sheet to provide good sliding contact surface for the cables. These four partitions will provide slots 91, 92 and 93 through which there are extended the respective cables 52, 68 and 40. Enough slackness is left in the cables passing through the slots so that even when the blocks B, C and D are in their uppermost positions (Fig. 5), the cables will not bind against the bracket member 88. Then as the blocks are lowered, the studs 34, 53 and 44 will move downward causing the cables to drop downward somewhat in the slots. But the slots are deep enough so that the cables will never come out of the slots even in lowermost of the blocks B, C and D.

The arrangement of the flexible cables in the loose U-shaped loops shown in Fig. 1, keeps the cables in proper alignment and does not permit them to twist or flex out of their normal looped positions when the knobs 43, 51 and 59 are turned, as the guides will prevent such twisting.

A suitable window 60 provided with a linear scale 61 will serve to show the spacings of the blocks. For this purpose suitable markers 62 may be placed on the side of each block at the window to register with the scale; and there can be a separate scale for each block. For fine adjustment, micrometer markings 63 on dials 43, 51 and 59 are provided, these markings registering with fixed reference marks 64. The bearing plates 90 of the flexible cable guide 87 will be made free enough relative to the cables so that after the blocks have been set in position by turning the dial, the dials will accurately indicate the positions of the blocks. There will, of course be some springiness in the flexible cables, but when a cable relaxes or springs back to its normal condition after turning the dial, the dial indication will then be correct.

By this mechanical arrangement, a very fine adjustment of distances between the several blocks may be had to a small fraction of an inch. Since each block is adjustable relative to the next preceding block, the usual manner of adjustment will be first to adjust the spacing of block B from the fixed block A. This will move blocks C and D as well as block B. Next, block C can be moved relative to block B which will also correspondingly move block D. Lastly, block D can be moved relative to block C.

A simple way of using the blocks is to make the records on the tape with all the blocks in contact with each other. Then for the playback the several movable blocks can be separated from their next adjacent blocks to the desired degree, as described above.

In using the mechanism for making seismic records, a number of seismometers or geophones are placed at different positions on the ground or in the water, where they receive wave impulses from an explosion in a well-known manner. The electrical outputs from the several seismometers are applied, ordinarily after amplification, to respective heads of a block, for example, the heads 4a, 5a, 6a and 7a, etc., of block A, the electrical leads being brought through conduits 100. For this purpose there should be as many such heads in the block as there are seismometers. In accordance with the operation described in the above-mentioned Peterson application, the output from each seismometer is divided into several paths or circuits. Where there are four blocks, as shown, there may be four such paths from the output of each seismometer. Thus, the divided outputs from a first seismometer will be connected with heads 4a, 4b, 4c and 4d, respectively; and the divided outputs of a second seismometer will go to the respective heads 5a, 5b, 5c and 5d, etc. The remaining seismometers will be similarly connected to remaining ones of the heads. Thus, there will be a record made by a head in each block in response to each seismometer output.

In making the records, the motor of the mechanism will be operated to start the magnetic tape in its path of travel; and an explosive charge will be fired while the seismometers are in their proper positions. The magnetic records will be made on the tape side by side in the positions determined by the lateral positions of the heads across the tape. There will be as many of these records made as there are heads connected with seismometer outputs. In addition there may be made other records, as desired, such as a conventional timing trace.

As is well understood in the art of magnetic recording, the heads can be used for playback as well as for recording. By an appropriate switching apparatus the heads can be connected to suitable receiving and recording apparatus, as is described in detail in the above-mentioned Peterson application; and when so connected, the wave trains played back by the individual heads can be made to appear on suitable photographic paper, or other media, side by side in a well known-manner.

It is desired for some purposes to change the relative spacing of the blocks on playback from their positions during the recording. The effect of doing this is to change the time relationship on the playback, of the several magnetic records of each seismometer output. When the outputs of the corresponding heads are combined in some desired manner, as described in the said Peterson application, a composite record can be obtained showing information which does not appear from the individual records made by the individual heads on recording on the tape. For the purpose of bringing out particular wave transients in the final records, the operator may select or adjust the relative block spacings as desired. Since the time increments involved in the wave trains are ordinarily quite small, small changes of head separation can produce appreciable changes in results. The provision of the dial mechanism with increments of distance marked both on the window of the housing and on the individual dials permits this desired fine adjustment.

It will be understood, of course, that in ordinary operation, there should not be more than a single complete traverse or revolution of the endless tape, at least while the record is being made. In the event that the tape runs for more than a complete revolution after the start of a record, any overlap of recording caused by the start of a second revolution would wipe out the overlapped part of the record.

It will be recognized that modifications within the scope of the invention may occur to those skilled in the art. For example, any desired number of blocks may be used, and any desired number of heads may be placed in the blocks. The particular form of the magnetic heads and their cores is of no especial consequence and is no part of the present invention. The invention is not limited except in accordance with the scope of the appended claims.

I claim:

1. Mechanism for recording and playback of records on magnetic tape, comprising: a housing, means for guiding the magnetic tape in a path of travel past the housing, a plurality of separate head holders in the housing located in succession one after the other along the path of travel of the tape, at least some of the head holders being movable back and forth relative to each other in the direction of travel of the tape, each head holder containing a magnetic recording head placed adjacent the surface of the tape, the individual heads being at different lateral positions across the tape, and being operatively separated from each other on the tape, and means attached to said movable head holders for moving them backward and forward relative to the direction of travel of the tape while maintaining their said successive positions relative to each other along the tape.

2. Mechanism for recording and playback of records on magnetic tape comprising: a housing, means for guiding the magnetic tape in a path of travel past the housing, a plurality of head holders retained by the housing located in succession one after the other along the path of travel of the tape, at least some of the head holders being movable back and forth relative to each other in the direction of travel of the tape, each head holder containing a plurality of magnetic recording heads placed adjacent the surface of the tape, the individual heads being spaced laterally from each other across the tape in the direction transverse to the direction of travel of the tape and being operatively separated from each other on the tape, and means attached to said movable head holders for moving them backward and forward relative to the direction of travel of the tape while maintaining their said successive positions relative to each other along the tape, and means for moving the movable head holders in the direction of travel of the tape.

3. Mechanism according to claim 2 in which the means for moving the movable head holders comprises studs attached in turning relation to the respective movable head holders, each stud being threaded through a head holders other than that to which it is attached, and means for turning the studs.

4. Mechanism according to claim 3 in which a scale is provided on the housing in relation to the movable head holders to indicate the positions of the movable head holders.

5. Mechanism according to claim 3 in which the means for turning the studs comprises flexible cables attached to the respective studs.

6. Mechanism according to claim 3 in which the means for turning the studs comprises flexible cables attached to the respective studs and rotatable dials attached to the respective cables.

7. Mechanism according to claim 6 in which the dials are provided with angular scales indicating positions of the blocks.

8. Mechanism for recording and playback of records on magnetic tape comprising: a housing, a magnetic tape movable past the housing, a plurality of blocks in the housing located in succession one after the other along the path of travel of the tape, at least some of said blocks being movable back and forth relative to each other in the direction of travel of the tape, each block containing a magnetic recording head placed adjacent the surface of the tape and in recording and playback position, the individual heads being at different lateral positions across the tape, and means for moving the movable blocks in the direction of travel of the tape, said moving means comprising an individual stud in attached turning relation with each movable block and threaded through the next preceding block, and means for turning the studs.

9. In a magnetic tape recording system comprising a magnetic tape guided in a path of travel adjacent a recording head housing supporting a magnetic recording head: means for moving the recording head relative to the housing lengthwise of the tape, said means comprising a member in which the head is fixed said member being movable back and forth in the direction of travel of the tape, a threaded member held by the housing, a stud attached in turning relation to the movable member and threaded through the threaded member, a flexible cable attached to the stud, a guide having a guiding slot, said cable being looped and passing through the slot to maintain the cable in position when it is turned to turn the stud.

10. Apparatus according to claim 9 in which the loop of the cable is in the general form of a U, the bottom of the U passing through the slot, whereby turning of the cable correspondingly turns the stud and correspondingly moves the bottom of the U up and down in the slot.

11. Apparatus according to claim 9 in which a turning knob is attached to the end of the cable opposite the end attached to the stud.

12. In a magnetic tape recording system comprising a magnetic tape guided in a path of travel adjacent a housing supporting a plurality of magnetic heads in operating relation with the tape: a plurality of blocks arranged in tandem to each other along said path of travel, at least one of said blocks being movable relative to another block in the direction of longitudinal movement of the tape, there being at least one head in each block, and means for moving the blocks relative to each other while maintaining their tandem relationship, said means comprising a threaded member fixed relative to said one block, a stud attached in turning relation to said other block, and threaded through the threaded member, a flexible cable attached to the stud, a guide having a guiding slot, said cable being looped and passing through the slot to maintain the cable in position when it is turned to turn the stud.

13. Apparatus according to claim 12 in which there are a plurality of heads on each block.

14. Apparatus according to claim 12 in which the loop of the cable is in the general form of a U, the bottom of the U passing through the slot, whereby turning of the cable correspondingly turns the stud and correspondingly moves the bottom of the U up and down in the slot.

15. Mechanism for recording and play back of records on magnetic tape, comprising: a housing, means for guiding the magnetic tape in a path of travel past the housing, a plurality of separate head holders supported by the housing and maintained in tandem in relationship with each other along the path of travel of the tape, at least some of the head holders being movable back and forth relative to each other in the direction of travel of the tape, each head holder containing a plurality of magnetic recording heads placed adjacent the surface of the tape and laterally spaced from each other across the width of the tape, the heads of the different head holders being operatively separated from each other in the direction of travel of the tape, and means attached to said movable head holders for moving them backward or forward relative to the direction of travel of the tape while maintaining the tandem relationship of the head holders.

16. Mechanism according to claim 15 in which the heads of each head holder are located at different lateral positions across the width of the tape from the heads of any of the other head holders.

References Cited in the file of this patent

UNITED STATES PATENTS

| | | |
|---|---|---|
| 1,883,561 | Chipman | Oct. 18, 1932 |
| 2,058,399 | Begun | Oct. 27, 1936 |
| 2,243,730 | Ellis | May 27, 1941 |
| 2,440,971 | Palmer | May 4, 1948 |
| 2,530,584 | Pontius | Nov. 21, 1950 |
| 2,644,856 | Pettus | July 7, 1953 |
| 2,676,798 | Blaney | Apr. 27, 1954 |
| 2,756,279 | Lang | July 24, 1956 |
| 2,806,757 | Cunningham | Sept. 17, 1957 |